UNITED STATES PATENT OFFICE.

GRIGORI PETROFF, OF PETROGRAD, RUSSIA.

PROCESS FOR OBTAINING FROM PARAFFIN, WAX, FATS AND RESINS, NAPHTHA AND MINERAL OILS, PRODUCTS DISSOLUBLE IN WATER OR FORMING WITH IT COLLOIDAL SOLUTIONS.

1,230,599.     Specification of Letters Patent.     Patented June 19, 1917.

No Drawing.     Application filed July 31, 1915. Serial No. 43,018.

*To all whom it may concern:*

Be it known that I, GRIGORI PETROFF, chemist, a subject of the Czar of Russia, residing at 23 Pessochna street, Petrograd, Russia, have invented certain new and useful improvements in processes for obtaining from paraffin, wax, fats and resins, naphtha and mineral oils, products dissoluble in water or forming with it colloidal solutions; and I do hereby declare the following to be a full, clear, and exact description of the invention, such as will enable others skilled in the art to which it appertains to make and use the same.

As is well known, in order to obtain mineral oils soluble in water or forming with it emulsions of colloidal solutions, mineral oils are mixed with fatty acids, resin oils, resinous oils, colophony, saponified by strong water solutions or caustic alkali or ammonia and, in order to obtain a more uniform and transparent product, ethyl alcohol or sulfonated castor oil is added. For instance, 20 kilograms light resin oil, 20 kilograms olein, 7–10 kilograms solution of caustic soda of 33° Bé., 100 kilograms mineral oil of 0.900 specific gravity, 20 kilograms denaturized spirit are taken. The oils are mixed and warmed to a moderate temperature and the spirit and alkali are added by turns until an oily product is obtained which forms with water a stable emulsion. (*Messenger of the Fat Industry* for 1909, No. 6, page 87).

A further example is the following: 30 kilograms of sulfonated castor oil, 30 kilograms refined resin oil, 100 kilograms mineral oil, 10 kilograms colophony, 30 kilograms olein. Colophony is melted and after it is cooled sulfonated castor oil, resin oil and olein are added. The mixture is gradually and slowly stirred and a solution of caustic soda of 30° Bé. is added until the mixture becomes transparent and is able to form an emulsion with water. (*Messenger of the Fat Industry*, 1909, No. 6.)

The inventors have found that in order to obtain the so-called soluble mineral oils as well as materials forming solutions, colloidal solutions or emulsions with water, such bodies being hereinafter referred to in the specification and claims as "water soluble products" from paraffins, fats, wax and resins, the sulfo acids derived from hydrocarbon, naphtha or mineral oils, for example, by the method described in the specification of G. Petroff's United States Patent No. 1,087,888, dated Feb. 17, 1914, or of the alkali metal and ammonium or like salts derived from these acids or from the sulfonated distillates of naphtha and mineral oils may be employed. In order to obtain the above mentioned water soluble products, the described sulfo acids or their alkali metal and ammonium salts in the anhydrous state as such, or dissolved in benzol, acetone, benzin, ether, or the like, are introduced into the oils, fats, resins or other substances, and whenever solvents are used they may be driven off with the aid of heat or by blowing out with air.

Example 1: 80 parts of sunflower oil are mixed with 40 parts of benzol solution containing 50% of sulfo acids; the benzol is driven off by blowing out with the aid of air.

Example 2: 50 parts by weight of paraffin and 50 parts by weight of the anhydrous sodium salt of the sulfo acids are melted together.

Example 3: To 60 parts by weight of machine oil of 0.906 specific gravity, 40 parts by weight of anhydrous potassium (or calcium) salts of the sulfo acids are added during warming.

The mixture of fats, wax, resins and oils thus obtained according to the quantity of sulfo acids and their salts introduced when mixed with water produce either transparent solutions or form very solid emulsions. By their chemical or physical qualities they differ greatly from all similar preparations heretofore known. Thus, for instance, owing to the presence of sulfo acids of naphtha and mineral oils they possess a greater emulsifying and moistening capacity than soaps and sulfonated vegetable oils and they are distinguished by their great permanence when warmed, and applied for working tissues or fabrics they penetrate better into the pores of the material than do the known materials employed for the like purpose. Moreover, acid emulsions according to the invention owing to the difficulty of splitting-off the sulfo group from the sulfo acids at ordinary boiling temperatures, will not form sulfuric acid in water solutions and the neutral emulsions when dissolved in water will not dissociate and yield free alkali. By virtue of these properties these preparations may find extensive application in textile industry.

Having now described our invention, what we claim as new and desire to secure by Letters Patent is:—

1. The process of making from substances capable of but not readily emulsifying, a material having the property of mixing with water in any desired proportion to form a stable, homogeneous emulsion, which consists in mixing said substance with a sulfonic body which has been separated from a sulfonated mineral oil.

2. The process of making from substances capable of but not readily emulsifying, a material having the property of mixing with water in any desired proportion to form a stable, homogeneous emulsion, which consists in mixing said substance with a sulfonic body which has been separated from a sulfonated mineral oil in the presence of a relatively small per cent. of a volatile solvent of said sulfonic body.

3. A readily emulsifying substance consisting of a mixture of a substance capable of but not readily emulsifying, with a mineral oil sulfonic body, said substance having the property of rapidly emulsifying when mixed with water in any desired proportion, to form a stable, homogeneous emulsion.

GRIGORI PETROFF.